United States Patent [19]
Janda et al.

[11] Patent Number: 5,927,063
[45] Date of Patent: Jul. 27, 1999

[54] HIGH EFFICIENCY REFORMED METHANOL GAS TURBINE POWER PLANTS

[75] Inventors: Gary F. Janda, Houston; Keith H. Kuechler, Friendswood; John J. Guide, Kingwood; Frank F. Mittricker, Houston; Frank Roberto, Kingwood, all of Tex.

[73] Assignee: Exxon Chemical Patents Inc., Houston, Tex.

[21] Appl. No.: 08/914,920

[22] Filed: Aug. 19, 1997

[51] Int. Cl.$^6$ .................................. F02C 3/28; F02C 3/30
[52] U.S. Cl. ...................... 60/39.02; 60/39.182; 60/39.12
[58] Field of Search ................................ 60/39.02, 39.12, 60/39.464, 39.182; 110/7 B, 7 R

[56] References Cited

U.S. PATENT DOCUMENTS

| | | | |
|---|---|---|---|
| 3,656,905 | 4/1972 | Smith et al. | 21/212 R |
| 3,738,103 | 6/1973 | Rudolph et al. | 60/39.02 |
| 4,274,256 | 6/1981 | Kalt et al. | . |
| 4,622,275 | 11/1986 | Noguchi et al. | 429/19 |
| 4,743,516 | 5/1988 | Noguchi et al. | 429/16 |
| 5,148,668 | 9/1992 | Frutschi | . |
| 5,431,007 | 7/1995 | Viscovich et al. | 60/39.12 |
| 5,669,216 | 9/1997 | Ankersmit et al. | 60/39.12 |
| 5,704,206 | 1/1998 | Kaneko et al. | 60/39.182 |

FOREIGN PATENT DOCUMENTS

| | | |
|---|---|---|
| 8778888-A | 3/1988 | Australia . |
| 2 577 990 | 8/1986 | France . |
| 7317505-A | 12/1995 | Japan . |
| WO 96/12091 | 4/1996 | WIPO . |

OTHER PUBLICATIONS

Camporeale, et al., "Design and Off–Design Performance of Advanced Mixed Gas–Steam Cycle Power Plants," Proc. Intersoc. *Energy Conversion Engineering Congr.*, vol. 2 pp. 695–698 (1996).

Bolland, et al., "Comparative Evaluation of Combined Cycles and Gas Turbine Systems With Water Injection, Steam Injection, and Recuperation," *Journal of Engineering for Gas Turbines and Power*, Trans. Of ASME,, vol. 117 pp. 138–145 (Jan. 1995).

Carapellucci, et al., "Characteristics of the Heat Recovery Methanol Reforming in CRGT Power Generation Systems," *ASME, International Gas Turbine Inst.*, vol. 9, pp. 257–264 (1994).

Kesser, et al., "Analysis of a Basic Chemically Recuperated Gas Turbine Power Plant," *Journal of Engineering for Gas Turbines and Power*, Trans. of ASME, vol. 116, pp. 277–284, (Apr. 1994).

McDonald, et al., "Recuperator Utilization for Gas Turbine Plant Performance Enhancement. Applications and Technology," *ASME, International Gas Turbine Inst.*, vol. 5, pp. 151–163.

Klaeyle, et al., "New Cycles for Methanol–Fuelled Gas Turbines," *ASME paper* 87–GT–175.

Nandjee, et al., "New Cycles of Methanol Gas Turbine", *Rev. Gen. Therm.*, vol. 25, pp. 19–25.

PCT International Search Report for PCT/US98/17149 (corresponding PCT application).

*Primary Examiner*—Charles G. Freay
*Assistant Examiner*—Ted Kim
*Attorney, Agent, or Firm*—Bradley A. Keller

[57] ABSTRACT

The present invention is a high efficiency reformed methanol (syngas) gas turbine power plant. The invention utilizes a Back Pressure steam Turbine (BPT) to maximize the thermal efficiency and the power output of a reformed methanol gas turbine power generation system. Methanol feed is reformed to syngas ($H_2$ and $CO_2$) prior to combustion in the BPT turbine. The endothermic reforming reaction, and the generation of the significant amount of process steam essential for reforming, recovers most of the useful heat in the gas turbine exhaust gas. The process steam pressure is set by the gas turbine inlet requirements, and can be referred to as low pressure steam. Additional heat in the gas turbine exhaust gas is recovered by generating the system's process steam at an elevated pressure, rather than the required low pressure. This high pressure steam is used to drive a BPT, generating additional power and the discharged low pressure steam from the BPT is used as the process steam for the methanol reformer.

23 Claims, 1 Drawing Sheet

HIGH EFFICIENCY REFORMED METHANOL GAS TURBINE POWER PLANTS

FIELD OF THE INVENTION

The present invention relates to a combined gas/steam turbine power plant in which reformed methanol is the fuel for the gas turbine. Exhaust steam from a back pressure steam turbine is used in the methanol reformer.

BACKGROUND OF THE INVENTION

Considerable interest exists in improving the efficiency of power plants which use gas turbines. In simple cycle gas turbines, the heat in the exhaust gases from the turbines is wasted, leading to a low overall cycle efficiency.

Regeneration (preheating the fuel) is a simple method of increasing the efficiency of a power plant; however, the increased efficiency comes at the cost of reduced power output of the system. The reduced power output, combined with the added expense of the preheating equipment, increases the fixed cost of operating a power plant and, ultimately, the cost to the consumer.

Some in the field recover some of the waste heat in the exhaust of a gas turbine. For example, a condensing steam turbine driven by steam generated with heat from the combustion gases of the gas turbine has been used. Closed circuit (combined cycle) approaches of this kind improve the efficiency of the plant considerably but are expensive because of the requirements for a condenser and a cooling water loop for the steam turbine, which may require cooling towers.

Other methods of recovering the heat from the exhaust gases use Chemically Recuperated Gas Turbines ("CRGT"). In the CRGT cycle, the waste heat from the gas turbine is recovered in chemical reformers. The CRGT cycle has advantages over a steam-injected gas turbine ("STIG") cycle, and gas turbines without steam injection, in reduced emissions of nitrogen oxides. With the use of natural gas, temperatures of 700–900° C. are needed for reforming, whereas for alcohols, chemical recovery of the waste heat can be performed at lower temperatures with existing gas turbine technologies and recovery devices. Methanol, in particular, is particularly desirable due both to its intrinsic characteristics as a fuel (excellent combustion properties, low environmental pollution emissions, low reforming temperature) and to the possibility of being produced from any fossil fuel and any renewable organic matter.

There is a need for a power plant, with a simple turbine design and with increased efficiency and low capital costs, that does not sacrifice the total power output of the plant. The plant should preferably operate at relatively low temperatures and use a readily available fuel, such as methanol. The present invention satisfies this need.

SUMMARY OF THE INVENTION

The present invention is a high efficiency power plant, comprising: a first turbine which, provided with a reformed fuel, drives a generator and discharges a gas having a first temperature; a heat recovery steam generator (HRSG) which, provided with said gas having a first temperature, produces a steam having a first pressure and discharges a gas having a second temperature which is less than said first temperature; a second turbine which, provided with said steam having a first pressure, drives said generator and discharges a steam having a second pressure which is less than said first pressure; and a reformer which, upon provision of a fuel, said steam having a second pressure, and said gas having a second temperature, reforms said fuel and provides said reformed fuel to said first turbine.

DETAILED DESCRIPTION OF THE INVENTION

Figure 1:
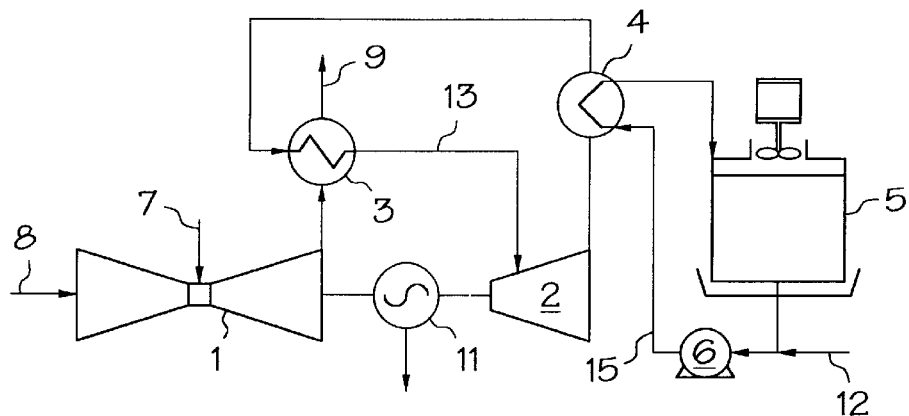
FIG. 1 is an illustration of a typical power plant using a natural gas turbine and a condensing steam turbine.
Figure 3:
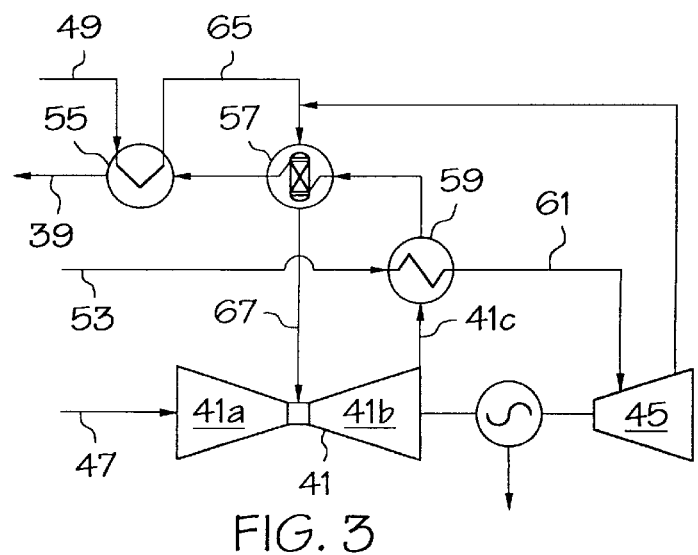
FIG. 3 is an illustration of a power plant according to the present invention.

The present invention, illustrated in FIG. 3, is best understood by comparing the features of the invention with corresponding features of two typical power plants. FIG. 1 shows a typical power plant using natural gas as a fuel. The gas turbine 1 consumes natural gas 7 as a fuel, and has incoming air 8. For illustrative purposes only, a GE7FA turbine manufactured by General Electric Company is used as a standard reference gas turbine, is considered with a fuel consumption of natural gas of 790 tons (803 tonnes) per day. The gas turbine drives a generator 11, the output of the gas turbine being 166 MW. The exhaust from the turbine goes to a heat recovery steam generator (HRSG) 3 while the exhaust from the HRSG is vented at 9. In the HRSG 3, high pressure steam (HP steam) 13 is produced at 550,000 pounds (249,500 kg) per hour. This high pressure steam is used as input to a steam turbine 2 to produce an additional 77 MW to drive the generator. The exhaust from the steam turbine goes to a condenser 4 where the steam is condensed and recirculated to the HRSG.

The condenser requires cooling water 15 that is provided by a pump: the used cooling water is, in turn, cooled in the cooling tower 5. The water from the cooling tower is recirculated to the condenser by the pump 6. Makeup cooling water is supplied, if necessary at 12.

Based on simulations carried out with a conventional computer program, the power plant of FIG. 1 has an output of 237 MW (net) and a Low Heat Value (LHV efficiency) of 52% while the High Heat Value (HHV) efficiency is 47%. The high efficiency comes at the higher capital cost of an expensive condensing steam turbine and a cooling water circuit.

Figure 2:
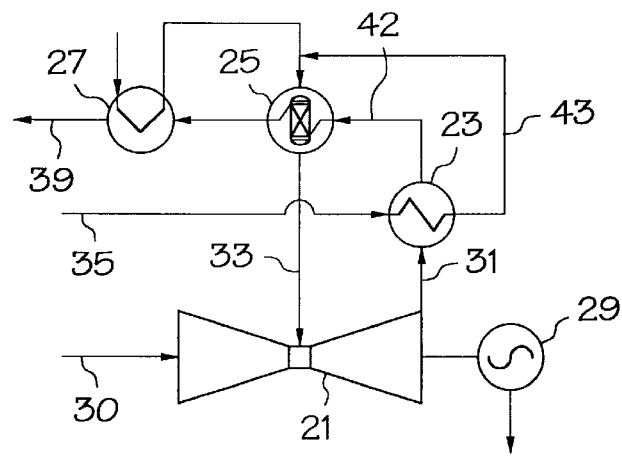
FIG. 2 is an illustration of a power plant using a gas turbine fired by synthetic gas obtained from reformed methanol.

FIG. 2 illustrates a power plant based on reformed methanol. The gas turbine uses input air 30 and reformed methanol 33 from a reformer 25. The reformed methanol is produced in the reformer by a two step process using gaseous methanol and steam. In the first step, gaseous methanol is catalytically decomposed to carbon monoxide and hydrogen according to the reaction $$CH_3OH \rightarrow CO + 2H_2 \tag{1}$$

Adding steam in stoichiometric proportions, the carbon monoxide can be converted to carbon dioxide, with further production of hydrogen, according to the equilibrium shift reaction $$CO + H_2O \leftrightharpoons CO_2 + H_2 \tag{2}$$

The overall methanol reforming process can be considered as the synthesis of two distinct processes, the first being the endothermic decomposition according to equation (1) and the second an exothermic carbon monoxide conversion reaction (2). In a properly designed reactor, both processes occur simultaneously.

The exhaust 31 from the gas turbine is used in a HRSG 23 to produce low pressure steam 43 from incoming fresh water 35. The residual heat in the exhaust 42 of the HRSG is used, in turn, to heat the reformer 25 and to preheat the methanol in the vaporizer 27 before being vented 39. The methanol and the low pressure steam (LP) are injected into the reformer 25, and the output of the reformer, consisting of reformed methanol and excess steam 33, is used to drive the turbine 21. The turbine, in turn drives the generator 29 to produce electrical power. In contrast to the device shown in FIG. 1, the water is not recirculated. The water is lost as part of the exhaust gases and is not recovered due to the prohibitive cost of recovery.

Computer simulations show the same gas turbine as shown in the example of FIG. 1 can be used to produce about 225 MW (net) of power with about 46% LHV efficiency in the configuration of FIG. 2. While the efficiency is lower than for the configuration of FIG. 1, the capital costs are considerably reduced because of the lack of a steam turbine, condenser and cooling tower.

FIG. 3 illustrates a power plant according to the present invention. The gas turbine 41 is supplied with air 47 from an intake vent 41a and reformed methanol including excess steam 67 from a reformer 57. The reformed methanol is burned in a combustion chamber 41b of the gas turbine and exhaust gases from the turbine exit the turbine through an exhaust vent 41c. The exhaust gases from the turbine are at a temperature of about 1100° F. (~595° C.). The exhaust gases from the gas turbine are used to successively (1) heat water 53 in a HRSG 59 to produce high pressure steam 61; (2) heat the reformer 57 to produce the reformed methanol; and (3) preheat the methanol 49 in the vaporizer 55 to produce vaporized methanol. The gaseous discharge from the HRSG is at a lower temperature than the exhaust from the gas turbine but are still hot enough to heat the reformer. In an alternate embodiment, the exhaust gases are used to heat the reformer or the vaporizer indirectly through the use of a heat transfer fluid/medium.

The HRSG 59 is provided with a supply of water 53. This water is sometimes referred to as "once through water" because it is not recirculated. The HRSG produces HP steam. This HP steam is used to power a back pressure steam turbine (BPT) 43. A BPT differs from a condensing steam turbine in that the outlet gases of a BPT are still at a substantial temperature and pressure in the form of LP steam. A typical temperature for the steam at the outlet of a BPT is about 600° F. (~315° C.). In the present invention, this LP steam is used as input to the reformer 57 along with the vaporized methanol 65. In an alternate embodiment, the turbine 41 is a STIG, and the LP steam could be used for reforming and steam injection for power augmentation in the turbine. The LP steam could also be used for other processes, such as reformer heat input, a heat transfer fluid/medium, reforming steam, etc.

In a preferred embodiment, the reformer 57 is used to produce reformed methanol from methanol and steam. The reforming could be done in a two step process by the reactions given above in equations (1) and (2); however, in a preferred embodiment, reformed methanol is produced in a single step process using a catalyst made of copper, zinc, aluminum, or mixtures thereof. Using the standard reference turbine mentioned above, computer simulation shows that the arrangement in FIG. 1 could produce 242 MW (net) at a 50% LHV efficiency. The power inputs to the generator are 228 MW from the gas turbine and 18 MW from the BPT.

In an alternate embodiment, instead of methanol, dimethyl ether (DME) is used as the fuel to produce syngas. Methane or liquefied petroleum gas (LPG) also could be used without deviating from the scope of the invention.

The present invention has a number of advantages compared to the power plants of FIG. 1 and 2. First, capital cost is reduced compared to a combined-cycle plant due to the absence of a steam turbine condenser and a cooling water loop. Secondly, a large portion of the power output (228 MW) comes from the gas turbine, a comparatively inexpensive piece of equipment while the output of the relatively more expensive steam turbine is 18 MW. In contrast, in the power plant of FIG. 1, the steam turbine output is about half the output of the gas turbine. Due to the comparatively high cost of the steam turbine, the combined capital cost of the turbines is much greater for the power plant of FIG. 1 than for the present invention. Use of a BPT turbine thus reduces the capital cost at only a small loss of efficiency.

The physical characteristics of the syngas provide a boost in the power output of the gas turbine, with or without a STIG, when compared with a gas turbine fired with natural gas, with or without a STIG turbine. The boost results from the ability to simultaneously meet the output limit of the gas turbine while at the same time achieving full heat recovery from the gas turbine exhaust by the methanol reforming and the HP steam generation. Efficient steam generation and heat recovery are possible at a high pressure and temperature set by the exhaust temperature of the gas turbine.

Since the gas turbine is operating at its maximum rate, all of the available high pressure steam cannot be used to feed the gas turbine in a STIG process. The BPT, by generating incremental power while letting down the HP steam to LP steam, allows efficient recovery of the heat from the exhaust gases. The BPT also could be used with a reformed methanol scheme to produce process steam for a steam injected gas turbine. The lowest pressure level is set by the specific gas turbine configuration. Typically, this lowest pressure level is in the range of from about 300 to about 400 psi (2.07–2.76 MP$a$), which is the combustion pressure of the gas turbine.

Persons of ordinary skill in the art will appreciate that many modifications may be made to the embodiments described herein without departing from the spirit of the present invention. Accordingly, the embodiments described herein are illustrative only and are not intended to limit the scope of the present invention.

We claim:

1. A power plant, comprising:
   (a) a first turbine which, provided with a reformed fuel, drives a generator and discharges a gas having a first temperature;
   (b) a heat recovery steam generator (HRSG) which, provided with said gas having a first temperature, produces a steam having a first pressure and discharges a gas having a second temperature which is less than said first temperature;
   (c) a second turbine which, provided with said steam having a first pressure, drives said generator and discharges a steam having a second pressure which is less than said first pressure; and
   (d) a reformer which, upon provision of a fuel, said steam having a second pressure, and said gas having a second temperature, reforms said fuel and provides said reformed fuel to said first turbine.

2. The power plant of claim 1, wherein said reformer discharges an exhaust gas and said power plant further comprises a preheater/ vaporizer which, provided with said exhaust gas, preheats and vaporizes said fuel and supplies a substantially vaporized fuel to said reformer.

3. The power plant of claim 1 wherein said fuel is methanol.

4. The power plant of claim 1 wherein said fuel is dimethyl ether.

5. The power plant of claim 1 wherein said fuel is a light hydrocarbon.

6. The power plant of claim 1 wherein said reformer uses a catalyst to convert said fuel into said reformed fuel, wherein said catalyst is selected from the group consisting of copper, zinc, aluminum, and mixtures thereof.

7. The power plant of claim 1, further comprising a steam injected gas turbine driven by said steam having a second pressure.

8. The power plant of claim 1, wherein said steam having a second pressure further comprises a source of heat for a process.

9. A power plant, comprising:
(a) a first gas turbine which, provided with a reformed gaseous fuel and a steam having a first pressure, drives a generator and discharges a gas having a first temperature;
(b) a heat recovery steam generator (HRSG) which, provided with said gas having a first temperature, produces a steam having a second pressure which is greater than said first pressure and discharges a gas having a second temperature which is less than said first temperature;
(c) a reformer which, upon provision of a fuel, said steam having a first pressure, and said gas having a second temperature, reforms said fuel and provides said reformed fuel to said STIG; and
(d) a second turbine which, provided with said steam having a second pressure, drives said generator.

10. The power plant of claim 9, wherein said steam turbine discharges said steam having said first pressure.

11. The power plant of claim 10, wherein said reformer discharges an exhaust gas and said power plant further comprises a preheater/vaporizer which, provided with said exhaust gas, preheats and vaporizes said fuel and supplies a substantially vaporized fuel to said reformer.

12. The power plant of claim 9 wherein said fuel is methanol.

13. The power plant of claim 9 wherein said fuel is dimethyl ether.

14. The power plant of claim 9 wherein said fuel is a light hydrocarbon.

15. The power plant of claim 9 wherein said reformer uses a catalyst to convert said fuel into said reformed fuel, wherein said catalyst is selected from a group consisting of copper, zinc, aluminum, and mixtures thereof.

16. A method of generating electricity from a fuel, comprising:
(a) operating a first turbine which, provided with a reformed fuel, drives a generator and discharges a gas having a first temperature;
(b) operating a heat recovery steam generator (HRSG) which, provided with said gas having a first temperature, generates a steam having a first pressure and discharges a gas having a second temperature which is less than said first temperature;
(c) supplying said steam having a first pressure to a second turbine which drives said generator and discharges a steam having a second pressure which is less than said first pressure; and
(d) operating a reformer which, upon provision of a fuel, said steam having a second pressure, and said gas having a second temperature, reforms said fuel and provides said reformed fuel to said first turbine.

17. The method of claim 16, wherein said reformer discharges an exhaust gas and said power plant further comprises a preheater/vaporizer which, provided with said exhaust gas, preheats and vaporizes said fuel and supplies a substantially vaporized fuel to said reformer.

18. The method of claim 16 wherein said fuel is methanol.

19. The method of claim 16 wherein said fuel is dimethyl ether.

20. The method of claim 16 wherein the fuel is a light hydrocarbon.

21. The method of claim 16 further comprising using a catalyst in said reformer to convert said fuel into said reformed fuel, wherein said catalyst is selected from the group consisting of copper, zinc, aluminum, and mixtures thereof.

22. The method of claim 16, further comprising using said steam at a second pressure to drive a steam injected gas turbine.

23. The method of claim 16, further comprising using said steam at a second pressure as a source of heat for a process.

* * * * *